United States Patent Office 2,865,884
Patented Dec. 23, 1958

2,865,884

POLYETHYLENICALLY UNSATURATED POLYSILOXANES

Peter L. de Benneville, Philadelphia, and Marvin J. Hurwitz, Elkins Park, Pa., assignors to Rohm & Haas Company, Philadelphia, Pa., a corporation of Delaware No Drawing. Application May 12, 1955
Serial No. 507,973

10 Claims. (Cl. 260—46.5)

This invention concerns novel polysiloxanes having terminal unsaturated groups of vinyl type connected to the silicon atoms of the polysiloxane through aliphatic groups comprising oxygen or sulfur atoms in the linkage. The invention is also concerned with polymers and copolymers of such compounds and to methods for the preparation of such compounds.

The new monomeric compounds of the present invention have the structure of Formula I:

(I)
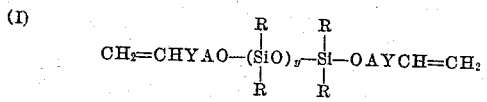

where Y is an oxygen or sulfur atom, A is a cyclohexylene or alkylene group having 2 to 8, preferably 2 to 4, carbon atoms, at least two thereof extending in a chain between the adjacent O and Y atoms, R is a lower alkyl group having 1 to 4 carbon atoms, preferably being methyl, and $y$ is an integral or mixed number having an average value from about 1 to 9.

The new compounds of Formula I may be made by reacting corresponding dichloropolysiloxanes of Formula II with an alcohol of Formula III, Formulas II and III being as follows:

(II)
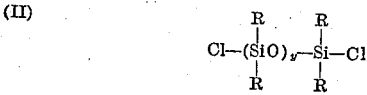

where R and $y$ are defined above;

(III) $\qquad CH_2=CHYAOH$ 

where Y and A are defined as before.

The chloropolysiloxanes of Formula II and their method of production are generally disclosed in U. S. Patent 2,381,366. These chloropolysiloxanes are reacted with two molar equivalents of an alcohol of Formula III. If desired, a mixture of two or more different alcohols of Formula III may be used to provide polysiloxanes which may include different vinyloxyalkyl or vinylthioalkyl groups at each end of the polymeric molecule. A tertiary amine such as trimethylamine, triethylamine, pyridine or quinoline is used as an acceptor for the hydrogen chloride produced. The reaction with the alcohol may be effected at a temperature of about −20° C. to room temperature or above, preferably between −5° C. and +10° C. The reaction is preferably carried out in an anhydrous solvent, such as benzene, toluene, or xylenes, or one of the tertiary amines above. The reaction is rapid and exothermic and, therefore, it is preferred to add one of the reactants or a solution of one of the reactants to the other reactant or to a solution thereof in one of the anhydrous solvents mentioned above at a rate that is sufficiently slow to enable proper control of the temperature by cooling means. Generally, the reaction is complete at the end of the addition of one reactant to the other. Sufficient tertiary amine should be added to take up all of the hydrogen chloride liberated and preferably an excess over this amount is used.

An alternate mode of preparation which is generally advantageous and preferred for preparing certain of the compounds of Formula I is to prepare a diaminopolysiloxane of Formula IV:

(IV) $\qquad R'R''N\!-\!(Si(R)_2O)_y Si(R)_2 NR'R''$ 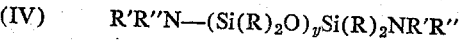

where R is a lower alkyl group having 1 to 3 carbons, methyl being preferred,

R' and R'' together may be the morpholino residue $=(CH_2CH_2)_2O$, the piperidino residue $-(CH_2)_5-$ or the pyrrolidino residue $-(CH_2)_4-$ or separately, R' may be phenyl, aralkyl, such as benzyl, cyclohexyl, or an alkyl group having 1 to 18 carbon atoms, R'' may be hydrogen, aralkyl, such as benzyl, cyclohexyl, or an alkyl group having 1 to 18 carbon atoms, the total of carbon atoms in R' and R'' being no greater than 18, with the proviso that when R' is an alkyl group having a tertiary carbon atom attached to the nitrogen, R'' must be H.

A compound of Formula IV is then reacted with two moles (per mol of Compound IV) of an alcohol of Formula III, thereby producing a compound of Formula I with liberation of two mols of an amine by-product of the formula NHR'R''. This reaction may be effected by simply mixing the diaminopolysiloxane of Formula IV with the alcohol of III and heating the mixture to a temperature adequate to distil off the amine NHR'R'' to be removed. This method is particularly applicable when the group —NR'R'' is that of a low boiling amine, such as t-butylamine. The group —NR'R'' may also correspond to that of methyl, ethyl, propyl, isopropyl, hexyl, phenyl, benzyl, octadecylamine, or the like, or it may correspond to morpholine, piperidine, pyrrolidine, dimethylamine, diethylamine, and so on. When a high boiling amine (NHR'R'') is liberated which would require temperatures above about 100° C. to effect distillation, it is preferable to employ a vacuum to enable a lower temperature to be maintained in the reaction system. In any case, distillation of the amine formed on condensation leaves the desired product substantially free of impurities. No special step or steps for separating or purifying the product of Formula I is required.

Products of Formula I are generally liquids which are relatively non-volatile and high boiling. They are generally soluble in organic solvents including benzene, toluene, xylene, aliphatic hydrocarbons, naphthenic hydrocarbons including the solvent naphthas of both aliphatic and naphthenic types as well as of aromatic type, ethyl acetate, dimethylformamide, dimethylacetamide, acetone, dioxane, chlorinated hydrocarbons including chloroform, ethylenedichloride, carbon tetrachloride and so on.

The products of the present invention are useful as additives for lubricants of the hydrocarbon type. They may also serve as synthetic lubricating oils or as power transmission media in hydraulic systems.

The diethylenically unsaturated compounds of Formula I are adapted to undergo addition polymerization and may be polymerized either in bulk (when they are liquid or low-melting solids), or in solution, such as in benzene, toluene, xylenes, solvent naphthas, acetone, dioxane, acetonitrile, dimethylformamide or dimethylacetamide. The temperature of polymerization may be from about 45° C. to 100° C. or higher. The polymerization may be accelerated by free radical initiators such as benzoyl peroxide, acetyl peroxide, lauroyl peroxide, cumene hydroperoxide, or preferably those of the azo type such as azo-diisobutyronitrile and the diesters and diamides of azodiisobutyric acid such as the dimethyl, diethyl, diisopropyl or dibutyl esters and the simple diamides or N- substituted amides including the N,N-dimethylamide thereof. The time of polymerization may vary from 2 to 24 hours.

The compounds may be homopolymerized to highly cross-linked polymers by these methods or copolymerized thereby. Examples of comonomers that may be polymerized with the unsaturated silanes of the present invention and thereby converted into insoluble, cross-linked copolymers include acrylonitrile, vinyl chloride, vinylidene chloride, tetrafluoroethylene, the vinyl aromatic compounds, more particularly the vinyl aromatic hydrocarbons (e. g., styrene, isopropenyl toluene, vinyl toluene, the various dialkyl styrenes, etc.), other aliphatic compounds containing a $CH_2=C<$ grouping, e. g. the various substituted acrylonitriles (e. g. methacrylonitrile, ethacrylonitrile, phenylacrylonitrile, etc.), acrylamide and the various substituted acrylamides (e. g. methacrylamide, ethacrylamide, the various N-substituted acrylamides and N-substituted alkacrylamides, for instance N-methylol acrylamide, N-monoalkyl and -dialkyl acrylamides and methacrylamides, e. g. N-monomethyl, -ethyl, -propyl, -butyl, etc. and N,N-dimethyl-, diethyl-, dipropyl-, dibutyl-, etc., acrylamides and methacrylamides, N-monoaryl and -diaryl acrylamides and alkacrylamides, e. g. N-monophenyl and -diphenyl acrylamides and methacrylamides, etc.), dimethylaminoethyl acrylamide, quaternaries of the latter, such as that obtained with benzyl chloride, vinyl esters, e. g. vinyl acetate, vinyl propionate, vinyl butyrate, vinyl isobutyrate, vinyl valerate, etc., esters of an acrylic acid (including acrylic acid itself and the various alpha-substituted acrylic acids, e. g. methacrylic acid, ethacrylic acid, phenylacrylic acid, etc.), more particularly the alkyl esters of an acrylic acid, e. g. the ethyl, propyl, isopropyl, n-butyl, isobutyl, sec-butyl, tert-butyl, amyl, hexyl, heptyl, octyl, decyl, dodecyl, hexadecyl, octadecyl, etc. esters of acrylic methacrylic, ethacrylic, phenylacrylic, etc. acids, vinyl ethers, such as butyl vinyl ether, N-vinyl compounds such as N-vinyl pyrrolidone, and olefins, such as ethylene, fluorinated vinyl compounds, such as vinylidene fluoride, as well as other vinyl aromatic and vinyl aliphatic compounds, and other compounds containing a single $CH_2=C<$ grouping.

The insoluble cross-linked polymers may be used for ion-exchange purposes. Molded products of infusible and insoluble character may be obtained by bulk copolymerization in a suitable mold. The compounds of Formula I may also be applied to fabricated articles of siliceous fibers, such as glass, asbestos, and mineral wool and polymerized in or on such articles so as to bind fibers thereof to impart dimensional stability thereto.

In the following examples which are illustrative of the present invention, the parts given are by weight unless otherwise noted:

Example 1

To a stirred mixture of 52 parts of β-hydroxyethyl vinyl sulfide, 101.2 parts of triethylamine, and 90 parts of dry benzene there is added dropwise a solution of 73 parts of an α,ω-dichloropolydimethylsiloxane mixture, having an average of 3.2 silicon atoms per molecule (y=2.2), and 90 parts of dry benzene, while the temperature is maintained at 0–5° C. The reaction mixture is then filtered and the filtrate stripped to yield 98 parts (92%) of crude product. The oily product, bis-(vinylthioethoxy)polydimethylsiloxane, serves as a synthetic lubricant and a hydraulic transmission fluid in a brake system. It retains its consistency even at low temperatures.

Example 2

The procedure of Example 1 is repeated substituting 44 parts of β-hydroxyethyl vinyl ether for the sulfide. A similar oily product is obtained. As a power transmission medium in a hydraulic lift, it retains its fluidity even down to −30° C.

Example 3

A mixture of 10 parts of β-hydroxyethyl vinyl sulfide and 85 parts of α,ω-di-t-butylaminopolydibutylsiloxane (having y averaging about 7.5) is heated until 11.3 parts of t-butylamine is removed by distillation. The oily product retains its lubricity and fluidity even at low temperatures.

Example 4

Ten parts of bis-(vinylthioethoxy)polydimethylsiloxane and 0.01 part of benzoyl peroxide are heated to 100° C. for 1 hour. The resultant polymer is clear and semi-rigid.

It is to be understood that changes and variations may be made without departing from the spirit and scope of the invention as defined in the appended claims.

We claim:

1. A composition of matter consisting of a compound having Formula I:

(I) 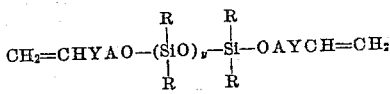

where Y is selected from the group consisting of oxygen and sulfur, A is selected from the group consisting of cyclohexylene and alkylene groups having 2 to 8 carbon atoms, at least two thereof extending in a chain between the adjacent O and Y atoms, R is a lower alkyl group having 1 to 4 carbon atoms, and y is a number having an average value from about 1 to 9.

2. A method comprising reacting, at a temperature of about −20° C. to about room temperature, a compound of Formula III following with a compound of Formula II following:

(II) 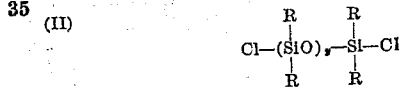

(III) 

where Y is selected from the group consisting of oxygen and sulfur, A is selected from the group consisting of cyclohexylene and alkylene groups having 2 to 8 carbon atoms, at least two thereof extending in a chain between the adjacent O and Y atoms, R is a lower alkyl group having 1 to 4 carbon atoms, and y is a number having an average value from about 1 to 9.

3. A method as defined in claim 2 in which the reaction is effected in the presence of a tertiary amine to accept the hydrogen chloride developed in the reaction.

4. A method comprising reacting at a temperature of about −20° C. to about room temperature, a compound of the formula $CH_2=CHYAOH$ with a compound of Formula IV following and heating to remove amine liberated by evaporation thereof, Formula IV being

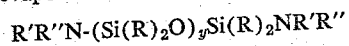

where R is a lower alkyl group having 1 to 4 carbon atoms, y is a number having an average value from about 1 to 9, R' and R'' are selected from the group consisting of radicals directly attached only to the adjoining N atom and radicals which together and with the adjoining N atom form a heterocyclic nucleus from the group consisting of morpholino, piperidino, and pyrrolidino, R', when directly attached only to the adjoining N atom, is selected from the group consisting of phenyl, aralkyl, cyclohexyl, and alkyl groups of 1 to 18 carbon atoms, and R'', when directly attached only to the adjoining N atom, is selected from the group consisting of H, aralkyl, cyclohexyl, and alkyl groups having 1 to 18 carbon atoms, the total of carbon atoms in R' and R'' being no greater than 18, with the proviso that when R' is an alkyl group having a tertiary carbon atom attached to the nitrogen, R'' must be H.

5. A method as defined in claim 4 in which the amine by-product is distilled off.

6. A composition of matter comprising an addition polymer of a compound defined in claim 1.

7. A composition of matter comprising an addition copolymer of a compound defined in claim 1 with a mono-ethylenically unsaturated comonomer.

8. A composition of matter consisting of bis-(vinylthioethoxy)polydimethylsiloxane.

9. A composition of matter consisting of bis-(vinyloxyethoxy)polydimethylsiloxane.

10. A composition of matter comprising an addition polymer of bis-(vinylthioethoxy)polydimethylsiloxane.

References Cited in the file of this patent

UNITED STATES PATENTS

| | | |
|---|---|---|
| 2,381,366 | Padnode | Aug. 7, 1945 |
| 2,481,349 | Robie | Sept. 6, 1949 |
| 2,547,944 | Iler | Apr. 10, 1951 |

OTHER REFERENCES

McGregor: Silicones and Their Uses, 1954, publ. by McGraw-Hill Book Co., Inc., N. Y., page 229.